United States Patent
Van Blessinger et al.

[11] Patent Number: 5,140,434
[45] Date of Patent: Aug. 18, 1992

[54] RECORD ON COMMAND RECORDING IN A SOLID STATE FAST FRAME RECORDER

[75] Inventors: Kurt Van Blessinger, Vista; Kris S. Balch, San Diego, both of Calif.

[73] Assignee: Eastman Kodak Company, Rochester, N.Y.

[21] Appl. No.: 472,509

[22] Filed: Jan. 29, 1990

[51] Int. Cl.⁵ ............................................. H04N 5/76
[52] U.S. Cl. ................................. 358/335; 360/9.1; 360/11.1; 360/5
[58] Field of Search ................. 360/5, 35.1, 9.1, 11.1, 360/33.1, 8, 10.1; 358/105, 335, 213.26, 337, 909, 312; 364/521

[56] References Cited

U.S. PATENT DOCUMENTS

| | | |
|---|---|---|
| 2,943,141 | 6/1960 | Knight . |
| 4,141,039 | 2/1979 | Yamamoto ........................ 360/8 X |
| 4,280,151 | 7/1981 | Tsunekawa et al. . |
| 4,322,752 | 3/1982 | Bixby ................................... 358/213 |
| 4,420,773 | 12/1983 | Toyoda et al. . |
| 4,456,931 | 6/1984 | Toyoda et al. . |
| 4,489,351 | 12/1984 | d'Alayer de Costemore et al. . |
| 4,496,995 | 1/1985 | Colles et al. ........................ 360/9.1 |
| 4,593,313 | 6/1986 | Nagasaki et al. . |
| 4,630,111 | 12/1986 | Blain et al. . |
| 4,685,002 | 8/1987 | Powers ................................. 360/9.1 |
| 4,837,628 | 6/1989 | Sasaki . |
| 4,887,161 | 12/1989 | Watanabe et al. ................... 358/224 |

FOREIGN PATENT DOCUMENTS

| | | |
|---|---|---|
| 0372514 | 6/1990 | European Pat. Off. . |
| 2353097 | 4/1975 | Fed. Rep. of Germany . |
| 2110042 | 6/1983 | United Kingdom . |

Primary Examiner—Robert L. Richardson
Attorney, Agent, or Firm—William F. Noval

[57] ABSTRACT

A fast frame recorder records images of an event at a fast frame rate and plays back the images at a slower frame rate to facilitate analysis of the event. Disclosed is a solid state fast frame recorder having a solid state imager, which is selectively operable at different frame rates and having a solid state memory for storing a plurality of image frames. A programmable control system controls the memory to store temporally nonconsecutive images from the imager according to a preselected program. Both temporally nonconsecutive single image frames and bursts of temporally consecutive image frames may be stored. The number of image frames in a stored burst and the frame rate of the stored burst may be selectively varied.

9 Claims, 5 Drawing Sheets

RECORD-ON-COMMAND SIGNAL

RECORD-ON-COMMAND SIGNAL
BURST NO "n" = 4

RECORD-ON-COMMAND SIGNAL
3 FRAMES PRE
3 FRAMES POST

RECORD ON COMMAND RECORDING IN A SOLID STATE FAST FRAME RECORDER

BACKGROUND OF THE INVENTION

This invention relates in general to a solid state fast frame recorder which records an event at a fast frame rate and plays back the event at a slower frame rate so that the event may be analyzed. More particularly, this invention relates to a solid state fast frame recorder having a solid state imager and a solid state memory for recording temporally nonconsecutive image frames from the imager according to a preselected program.

Fast frame recorders are useful for motion analysis of an event. A fast frame recorder records a great number of images during an event at a high or fast image frame rate and reproduces the image frames more slowly at a lower frame rate. Thus, any movement occurring during the event may be analyzed in a step-by-step progression. Applications for a fast frame recorder include, malfunctions in high speed machinery, movements of an athlete, testing of safety equipment, shattering an object, etc. One type of fast frame recorder is disclosed in commonly assigned U.S. Pat. No. 4,496,995, issued Jan. 29, 1985. As disclosed in the latter patent, the fast frame recorder-motion analyzer includes a video camera, a variable speed magnetic tape processor and a video display monitor. The camera is read out in block format so that a plurality of lines of video information that correspond to rows of photosites in the camera solid state imager are simultaneously recorded on magnetic tape in parallel longitudinal tracks. During play back, the magnetic tape is played back at a reduced tape speed. A plurality of parallel video signals reproduced from a plurality of parallel tracks on the tape, are processed into a serial video signal which may be used with standard video monitors. Although a magnetic tape, fast frame recorder is advantageous because of its ability to record a large number of image frames and because of the non-volatility of the image storage, there are limitations to magnetic tape recording. Such a fast frame recorder tends to be costly since, in recording and reproducing a plurality of parallel video signals, separate record and reproduce signal processing circuitry must be provided for each video signal channel. Since the video signals are recorded directly on magnetic tape in an analog format, picture quality is degraded significantly due to induced flutter and other noise, due to reduced bandwidth and increased phase distortion and due to imprecisely recorded pixel signal values.

In many applications where the use of a fast frame recorder is appropriate, the event to be recorded is random in nature and may occur at random moments during an extended period of time. Due to the inherent recording length constraints of a magnetic tape fast frame recorder, its ability to capture randomly occurring events may require the recording of a large number of image frames which are unnecessary for the analysis of the event. During playback, the unwanted images must be scanned before images relating to the event can be analyzed, resulting in a waste of time, money and recording tape. Moreover, certain events may be incapable of being recorded due to the length of elapsed time between recordable events.

SUMMARY OF THE INVENTION

According to the present invention, there is provided a fast frame recorder which minimizes the limitations of magnetic tape fast frame recorders. According to an aspect of the present invention, a fast frame recorder includes solid state memory for storing a plurality of image frames produced by a solid state image sensor wherein picture degradation produced by flutter of a magnetic tape fast frame recorder is eliminated and wherein dropouts are minimized to single pixel events. According to another aspect of the present invention, video information representing image frames are recorded in digital format in the solid state memory, thus inherently eliminating media noise and electronic noise associated with tape recording. Moreover, bandwidth limitations and phase distortion produced in magnetic tape recording systems is minimized by digital storage of image frames. The solid state fast frame recorder of the present invention is substantially immune to shock and vibration and to environmental conditions such as temperature and humidity.

According to a further aspect of the present invention, a solid state fast frame recorder includes a solid state imager which is selectively operable at different frame rates and solid state memory for recording image frames from the imager. Control means is provided to control the memory to store temporally nonconsecutive image frames from the imager according to a preselected program. Preferably the control means controls the memory to store both temporally nonconsecutive single image frames and bursts of temporally consecutive image frames.

DESCRIPTION OF THE DRAWINGS

In a detailed description of a preferred embodiment of the invention presented below, reference is made to the accompanying drawings in which like numerals refer to like elements.

DETAILED DESCRIPTION OF THE PREFERRED EMBODIMENT

Figure 1:
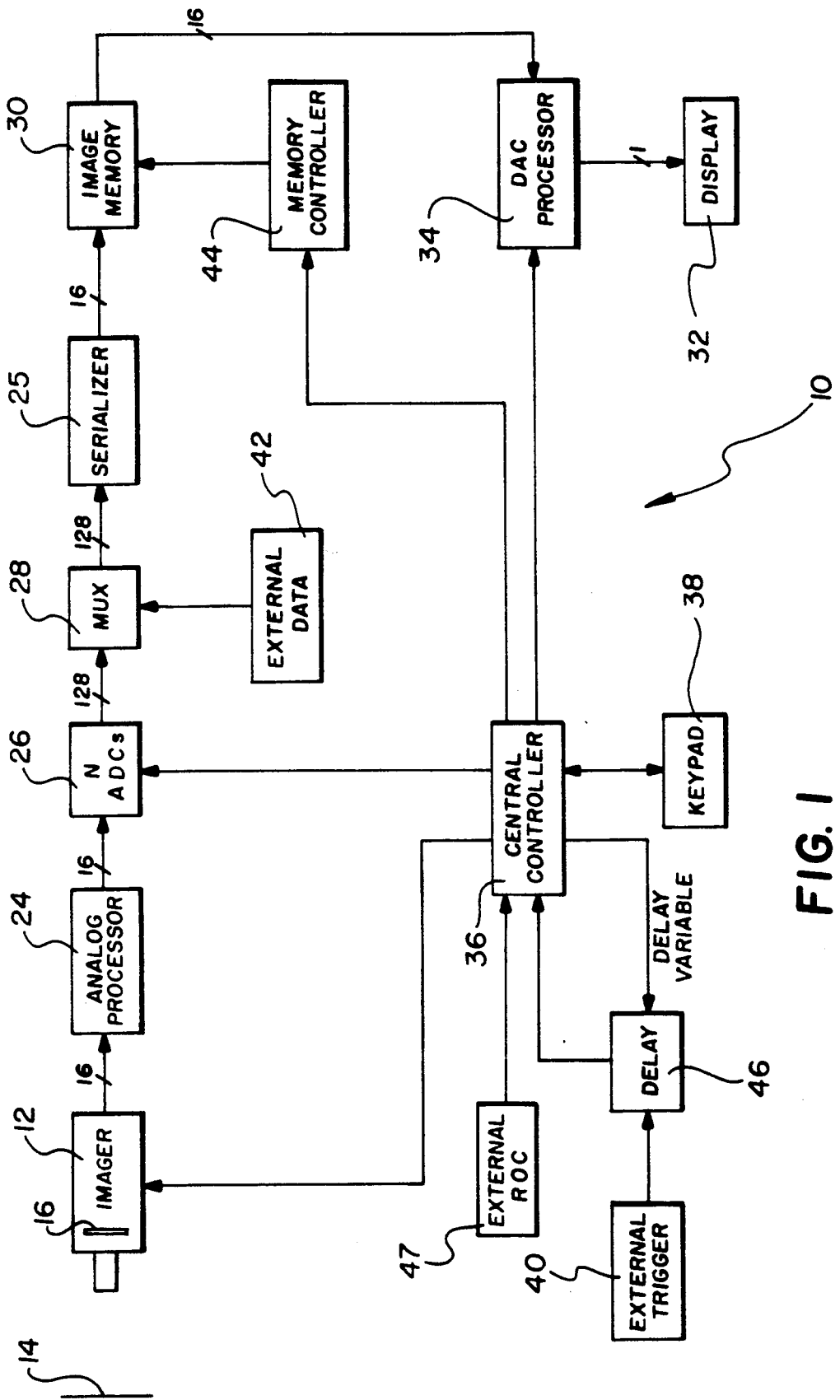
FIG. 1 is a block diagram of a preferred embodiment of the solid state fast frame recorder of the present invention.

Referring now to FIG. 1, there will be described a preferred embodiment of the solid state fast frame recorder of the present invention. As shown in FIG. 1, fast frame recorder 10 includes solid state imager 12 which images an event, such as scene 14, by means of a solid state, area imager 16. Imager 12 is controlled by central controller circuit 36 which supplies suitable control signals to imager 12 as a function of operator selectable frame rate and exposure time parameters. Imager 12 may operate, for example, at frame rates of 1 to 1,000 frames per second.

Figure 2:
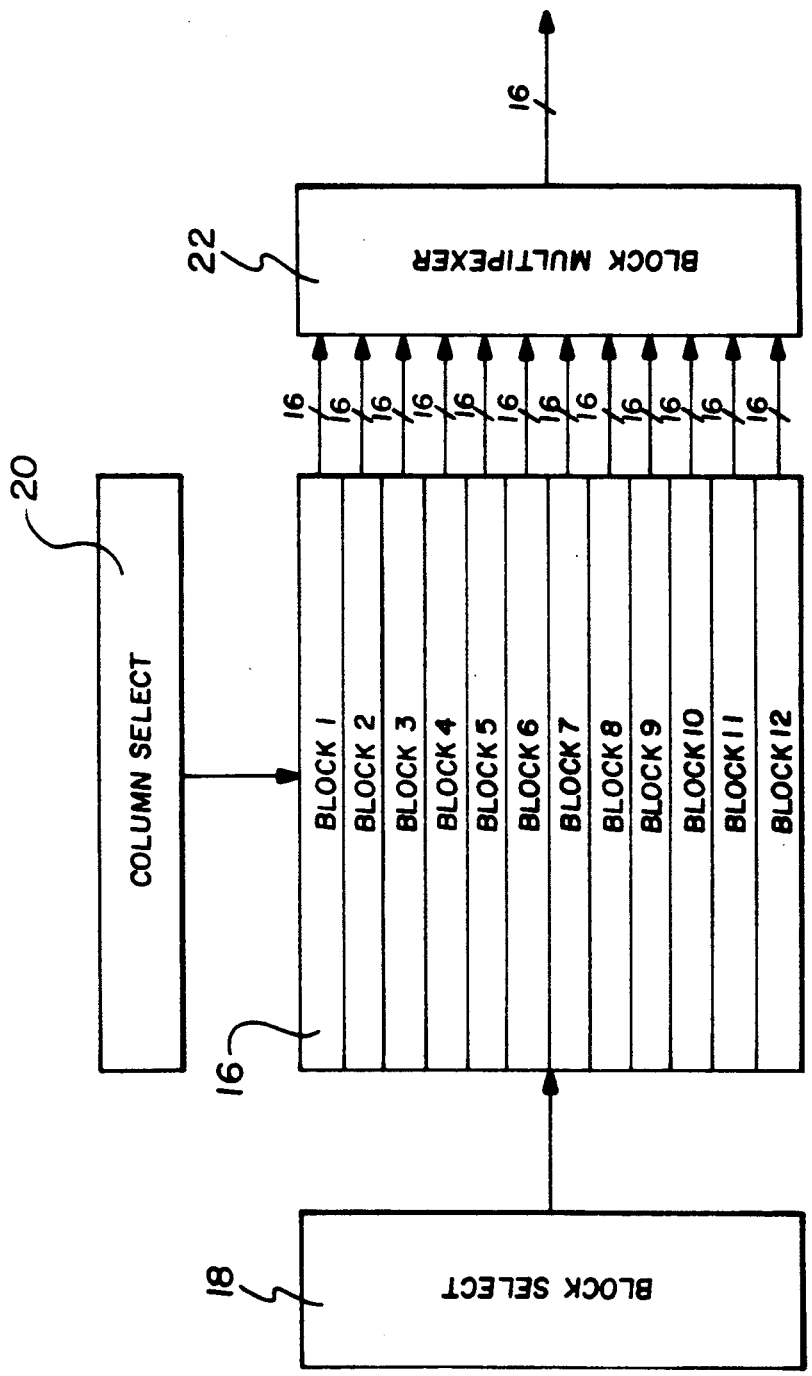
FIG. 2 is a functional block schematic diagram of a block readable image sensor.

Image sensor 16 is preferably a block "readable" area image sensor. The basic concept of a block readout of a solid state area image sensor and the timing and control thereof is disclosed in U.S. Pat. No. 4,322,752 in the name of James A. Bixby. Although the referenced patent provides detailed information, a brief description of the concept of block readout may be illustrated with respect to FIG. 2. FIG. 2 shows a block readable sensor 16 that includes an array of photosites (not individually shown) arranged in rows and columns. For purposes of readout, sensor 16 is schematically shown as being formatted into 12 blocks of 16 photosite rows in each block. Through appropriate control circuitry including block select circuit 18 and column select circuit 20, blocks 1-12 of sensor 16 are sequentially read out as parallel rows of photosites to block multiplexer circuit 22. Multiplexer 22 produces an image frame signal which includes sequential blocks of video information wherein each block of video information includes (16) parallel lines of video signals.

The parallel lines of video signals from multiplexer 22 are amplified and conditioned in analog processor 24 for preparation to be digitized. These parallel analog signals from analog processor 24 are converted into digital signals in ADC 26 by an Analog to Digital converter on each parallel signal line. Each ADC will output n parallel signal lines where n is equal to it's bit conversion size. Therefore, the number of output lines of ADC 26 will be n times the number of parallel lines of video signals. For example, if the number N of parallel video signals is "16" and the bit conversation number n is "8", the number of signal lines from ADC 26 is "128".

The multiplicity of signal lines from ADC 26 are converted to a more manageable number by the serializer 25. The serializer takes the n parallel lines associated with each ADC and converts the information on them into a bit serial format on one line. Therefore in this example, after serialization, there are the same number of parallel digital signal lines as there are parallel analog signal lines.

External data signals from source 42 are temporally associated with an image frame by inserting them in multiplexer 28 as a header or trailer with the image frame signals from ADC 26. These combined signals are then serialized in serializer 25 and stored in an image frame location in solid state image memory 30.

Image memory 30 is made up of a number of solid state Random Access Memory devices such as DRAMs or SRAMs. Inherently, to store information in RAM, a location needs to be addressed and then the information written to their input port. Subsequently, to retrieve the information back the location is re-addressed and then the information is read from the output port. Memory controller 44 is used to give order to the random access capability of RAM. When recording, it generates the address signals to the RAM in a known, fixed sequential format. Most importantly, this format is circular; once Image Memory 30 is full (can not store another image frame in a unique location) the RAM generator repeats the sequence of address signals thereby recording the newest image frame over the oldest. Visual analysis is accomplished when, during playback, the address signals are repeated in the same sequential format, but at a slower rate while Memory 30 is read.

Figure 3:
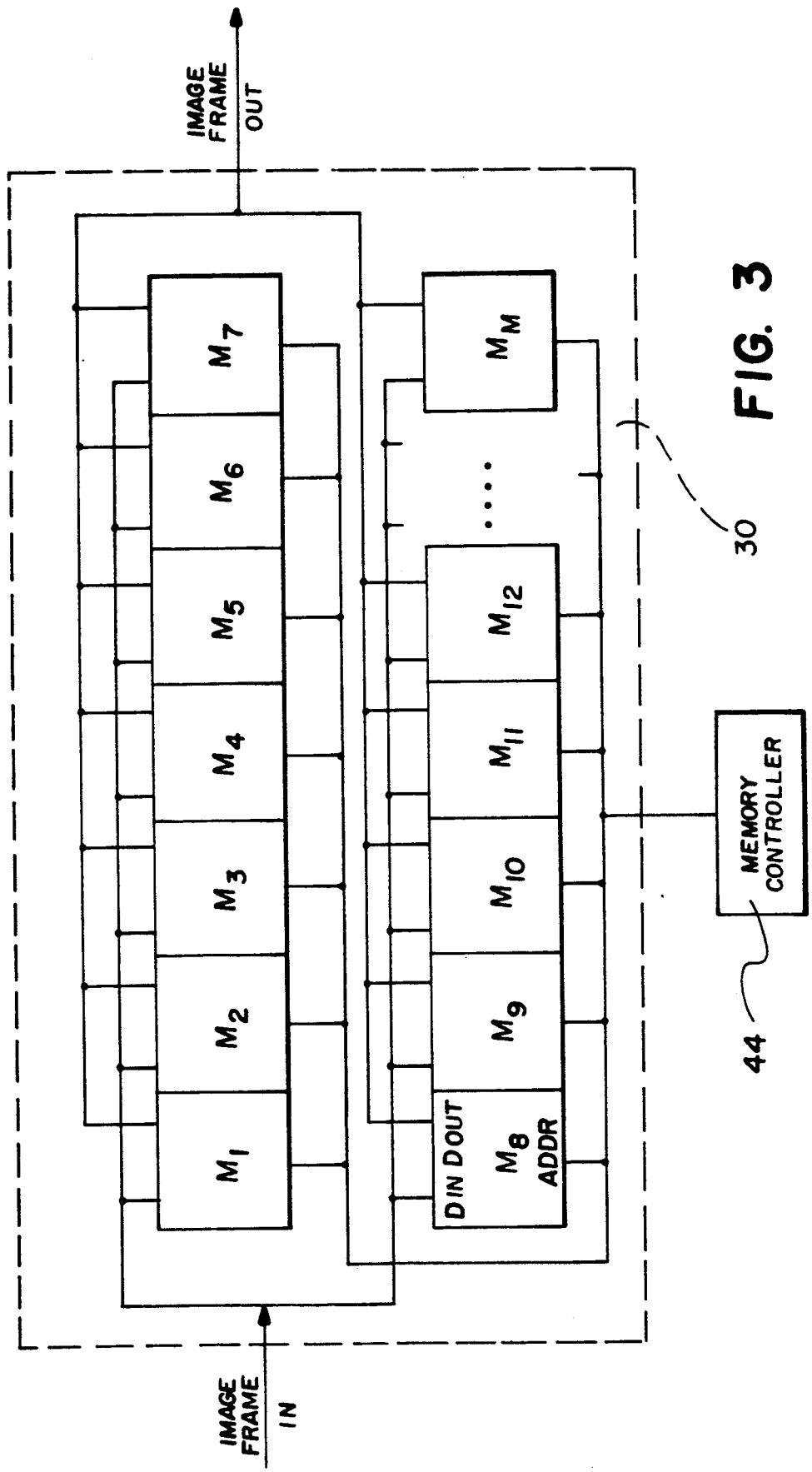
FIG. 3 is a functional block schematic diagram of the solid state memory of the embodiment of FIG. 1.

Memory 30 may have a storage capacity of any size but should be large enough to store a sufficient number of image frames to capture an event in totality for later analysis. As shown in FIG. 3, memory 30 includes M image frame locations numbered M, to $M_m$. As an example, if an image frame plus external data information forms a display matrix of 256×256 pixels and each pixel is represented by 8 bits of information, each image frame stored in memory 30 occupies approximately 65 kilobytes of memory. If 1000 image frames were to be stored, then memory 30 must have approximately 65 megabytes of solid state memory storage.

Image frames stored in memory 30 are displayed on monitor 32 by converting the digital image frame signal into an analog image frame signal by means of digital to analog converter processor (DAC) 34. Processor 34 extracts external data and displays them in a border around the image frame on display monitor 32. Central controller circuit 36 controls image memory 30 and processor 34 to vary the frame rate of playback on display monitor 32. Key pad 38 has suitable switches and controls to input data to control circuit 36 to control the operation of fast frame recorder 10.

Figure 4:
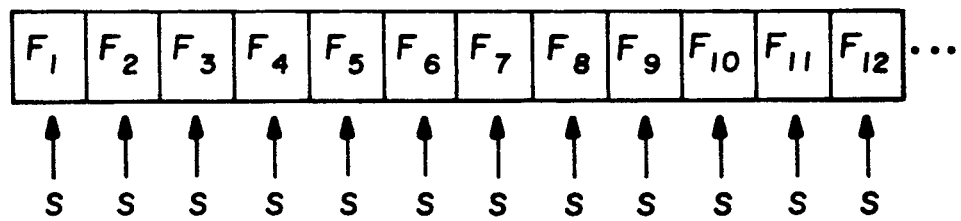
FIG. 4 is a diagrammatic showing useful in illustrating the normal operating mode of the embodiment of FIG. 1.

FIG. 4 illustrates the normal operating mode of recorder 10, in which temporally consecutive image frames produced by imager 10 are stored in memory 30. As shown, temporally consecutive image frames $F_1$, $F_2$, $F_3$ etc., are stored in memory 30 which is controlled by memory controller 44.

Fast frame recorder 10 is selectively operable to continuously record (in a circular or FIFO (First In, First Out) format) image frames of an event produced by imager 12. When memory 30 is full, new image frames produced by imager 12 are recorded over the oldest image frames in memory 30. In order to stop recording, either the operator actuates a stop switch or external trigger circuit 40 produces a trigger signal in response to an external event to stop recorder 10 from storing image frames in memory 30. Trigger 40 detects physical phenomena unique to the event to be recorded. The phenomena that sets the trigger can be as simple as a flash, switch closure, sound, temperature or a voltage change. At the time fast frame recorder 10 is triggered to stop, memory 30 will hold the sequence of image frames that depict the event prior to the trigger. A variable delay is provided by delay circuit 46 to stop recording after a trigger signal is produced by external trigger 40. Thus, a variable number of image frames before and after the triggering event may be recorded in memory 30.

According to the present invention, fast frame recorder 10 is operable in a record-on-command recording mode, in which, temporally consecutive or nonconsecutive image frames produced by imager 12, are selectively stored in memory according to an external binary signal applied to record-on-command circuit 47. Thus, one or more events of one or more consecutive frames can be selectively stored in memory. Moreover, the stored events need not have any timing relationship to one another.

Figure 5A:
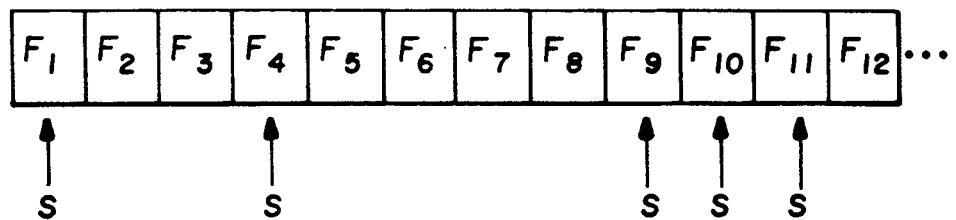
FIGS. 5A and 5B are respectively a diagrammatic showing and a signal diagram useful in illustrating the record-on-command recording mode of the present invention.
Figure 5B:

As shown in FIGS. 5A and 5B, events of one or more image frames stored in memory 30 are temporally nonconsecutive. As shown in FIG. 5A, both temporally nonconsecutive single image frames may be stored (e.g., $F_1$, $F_4$), and two or more temporally consecutive image frames of an event may be stored (e.g., $F_9$, $F_{10}$, $F_{11}$). Moreover, according to a feature of the present invention, both the number of consecutive frames per event and the time between events are controlled by external means through a record-on-command signal. When record-on-command signal is true (FIG. 5B), consecutive image frames are stored and when false, consecutive image frames are skipped.

Figure 6A:
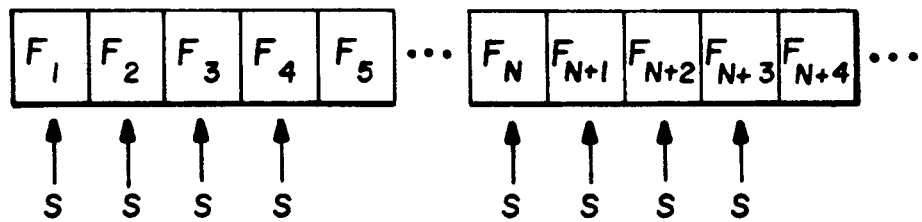
FIGS. 6A and 6B are respectively a diagrammatic showing and a signal diagram useful in illustrating another feature of the record-on-command recording mode of the present invention.
Figure 6B:
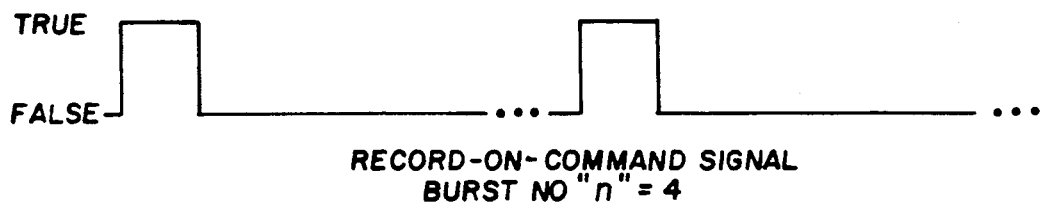

FIGS. 6A and 6B show another feature of the present invention. According to this feature, the number of consecutive frames per event are fixed and programmable from the keypad 38 and the time between events is controlled by external means through a record-on-command signal from source 47. When record-on-command signal transcends true, a burst of n frames, programmed from the keypad 38, are stored in memory 30. As shown, the record-on-command signal becomes true at frame $F_1$ and at frame $F_N$ (FIG. 6B) and the burst "n" is programmed at "4". Thus, frames $F_1$, $F_2$, $F_3$, $F_4$ and $F_N$, $F_{N+1}$, $F_{N+2}$, $F_{N+3}$ are stored in memory 30. The time between frames stored is variable and is not limited by the storage capacity of memory 30, as would be the case if magnetic tape were used as the storage medium.

Figure 7A:
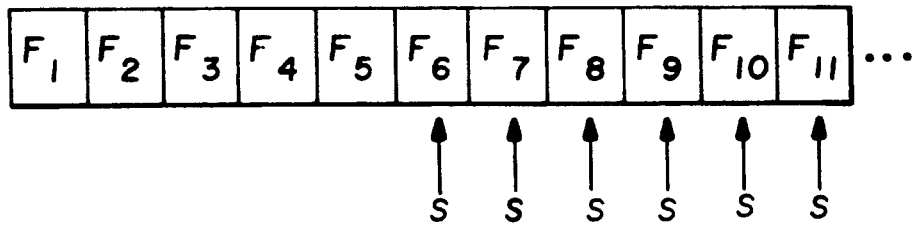
FIGS. 7A and 7B are respectively a diagrammatic showing and a signal diagram useful in illustrating a further feature of the record-on-command recording mode of the present invention.
Figure 7B:
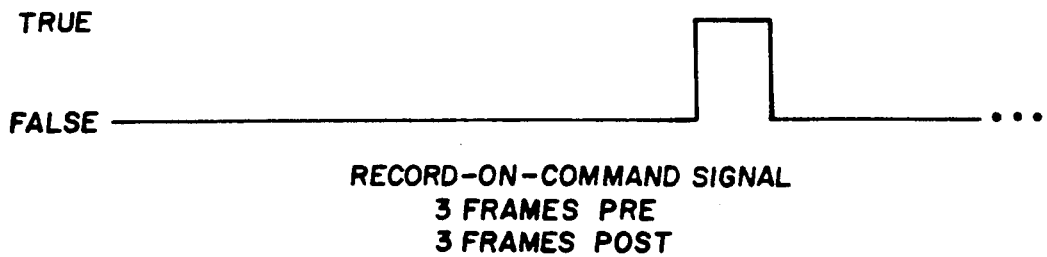

FIGS. 7A and 7B show another variation of the present invention. According to this variation, the number of consecutive frames per event previous to the record-on-command input transition signal are fixed and programmable from the keypad 38. Additionally, the number of consecutive frames per event after the record-on-command input transition signal are fixed and programmable from the keypad 38. Together, these two programmable parameters allow a burst of consecutive image frames to be recorded "around" the record-on-command input transition signal. Thus, in FIGS. 7A and 7B, there are stored three frames ($F_6$, $F_7$, $F_8$) before the record-on-command signal, and three frames ($F_9$, $F_{10}$, $F_{11}$) after such signal.

The elapsed time between stored frames is random and solely determined by the record-on-command input signal. In order to record this timing relationship between frames, each stored frame in memory 30 is time stamped by a clock in central controller 36 (the time is appended to the video). Upon playback, the relative time between any two frames can be determined by calculating the difference of their respective time stamps.

Although a preferred embodiment of the present invention has been described above, variations and modifications thereof will be evident to one skilled in the art. Thus, for example, fast frame recorder 10 can record at one frame rate and can play back at the same or a faster or slower frame rate. Moreover, the image frames recorded in memory 30 can be played back on display monitor 32 in the same sequence as they were recorded, or in a random sequence.

Although the invention has been described in detail with particular reference to a preferred embodiment thereof, it will be understood that variations and modifications can be effected within the spirit and scope of the invention as described above and as defined in the appended claims.

What is claimed is:

1. A solid state fast frame recorder comprising:
    solid state imager means for capturing an image of an event and for producing a plurality of temporally consecutive image frame signals, wherein said imager means is selectively operable at different image frame rates;
    programmable control means for controlling said memory means to selectively store temporally nonconsecutive image frame signals from said plurality of temporally consecutive image frame signals produced by said imager means, in response to an external record-on-command signal.

2. The solid state fast frame recorder of claim 1 wherein said control means controls said memory means to store both temporally nonconsecutive single image frame signals and bursts of temporally consecutive image frame signals in response to said record-on-command signal.

3. The solid state fast frame recorder of claim 2 wherein said control means includes means for selectively varying the number of consecutive image frame signals in a burst which is stored by said memory means.

4. The solid state fast frame recorder of claim 1 wherein said control means controls said memory means to selectively store one or more image frame signals before and after said external record-on-command signal.

5. A solid state fast frame recorder comprising:
    solid state imager means, having a plurality of photosites arranged in an array of rows and columns, for capturing an image of an event and for producing a plurality of temporally consecutive image frame signals wherein an image frame signal is produced by reading out blocks of parallel rows of photosites,
    said image frame signal including sequential blocks of video information, wherein each block of video information includes parallel lines of video signals, wherein said imager means is selectively operable at different image frame rates;
    solid state memory means for storing a plurality of image frame signals produced by said imager means; and
    programmable control means for controlling said memory means to selectively store temporally nonconsecutive image frame signals from said plurality of temporally consecutive image frame signals produced by said imager means in response to an external record-on-command signal.

6. The solid state fast frame recorder of claim 5 wherein said control means controls said memory means to store both temporally nonconsecutive single image frame signals and bursts of temporally consecutive image frame signals in response to said record-on-command signal.

7. The solid state fast frame recorder of claim 6 wherein said control means includes means for selectively varying the number of consecutive image frame signals in a burst which is stored by said memory means.

8. The recorder of claim 7 wherein said control means includes means for selectively varying the frame rate of said burst of stored image frame signals.

9. The recorder of claim 5 wherein said control means controls said memory means to selectively store one or more image frame signals before and after said external record-on-command signal.

* * * * *